United States Patent [19]
Olson

[11] Patent Number: 5,197,701
[45] Date of Patent: Mar. 30, 1993

[54] STAND FOR SUPPORTING A MUSICAL INSTRUMENT

[75] Inventor: Mark T. Olson, Venice, Calif.

[73] Assignee: Joel William Vuylskeke, Marina del Rey, Calif. ; a part interest

[21] Appl. No.: 853,077

[22] Filed: Mar. 17, 1992

[51] Int. Cl.⁵ .......................................... F16M 11/38
[52] U.S. Cl. ........................................ 248/166; 84/327
[58] Field of Search ............... 248/463, 465, 464, 168, 248/169, 171, 170, 96, 166, 683, 688, 150; 84/280, 327

[56] References Cited

U.S. PATENT DOCUMENTS

| | | | |
|---|---|---|---|
| 533,539 | 2/1895 | Kincade | 248/155.1 |
| 1,408,876 | 3/1922 | Frey | 248/166 X |
| 1,410,989 | 3/1922 | Borthwick | 248/96 |
| 1,673,205 | 6/1928 | Romao | . |
| 1,684,912 | 9/1929 | Dunklav | . |
| 2,751,176 | 6/1956 | Mowry | 248/96 |
| 2,796,795 | 6/1957 | Bach | 84/173 |
| 2,876,980 | 3/1959 | Salter | 248/683 |
| 3,251,258 | 5/1966 | Parker | 84/453 |
| 3,866,877 | 2/1975 | Thompson | 248/688 |
| 4,247,029 | 1/1981 | Levin | 224/271 |
| 4,592,265 | 6/1986 | Steinberger | 84/327 |
| 4,691,610 | 9/1987 | Gilbert | 84/327 |
| 4,693,161 | 9/1987 | Uhrig | 84/327 |
| 4,693,161 | 9/1987 | Ulhrig | 84/327 |
| 5,036,974 | 8/1991 | Ross | 248/96 X |

Primary Examiner—J. Franklin Foss
Attorney, Agent, or Firm—Harvey S. Hertz

[57] ABSTRACT

A stand for supporting a musical instrument, such as a guitar, in a upright position when not in use and for retention on the instrument in a collapsed position when the instrument is in use. The guitar has a lengthwise axis and the guitar body has a front surface across which playing strings are located, a rear surface and a bottom surface. The stand comprises a housing having a first surface adjacent to and secured to the rear surface of the guitar extending along the guitar lengthwise axis from the bottom surface of the guitar. A pair of retractable legs are releasably secured to the housing and movable from a flush position in the housing when the stand is not in use to an erect position where the legs and a portion of the housing adjacent the guitar bottom surface act to support the guitar.

10 Claims, 5 Drawing Sheets

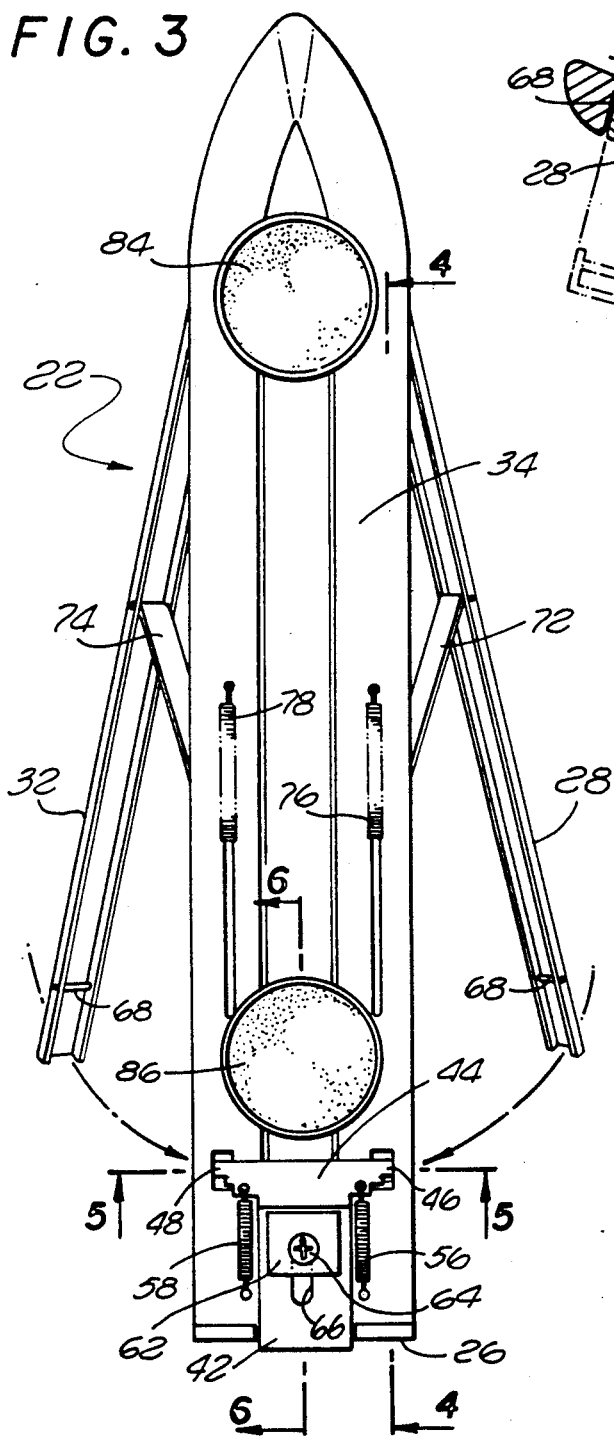
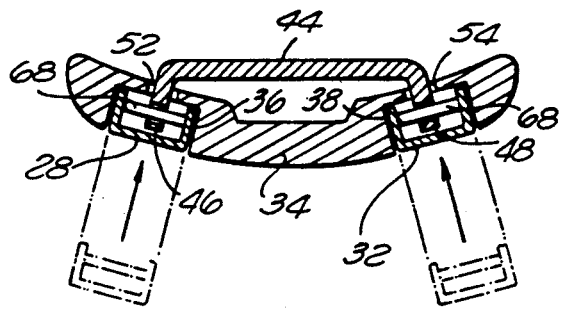
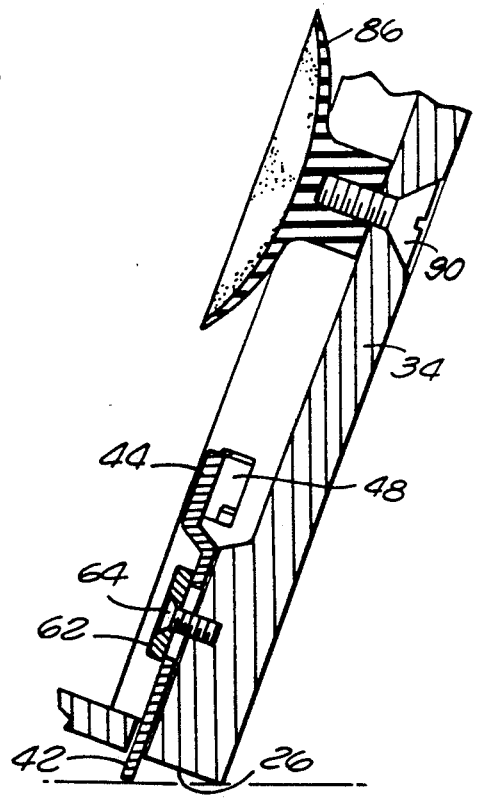

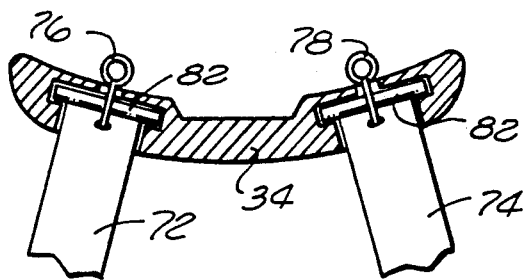
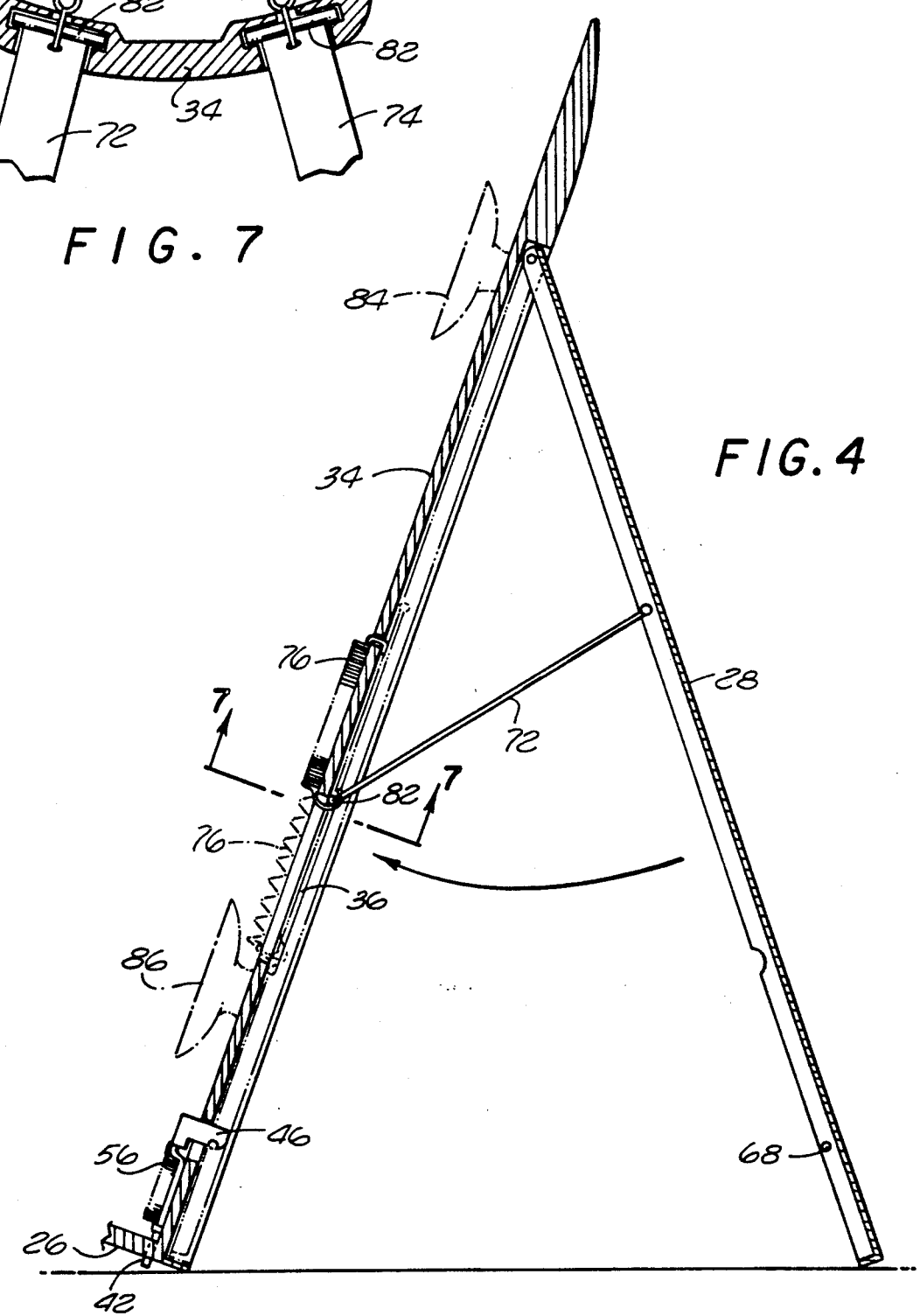

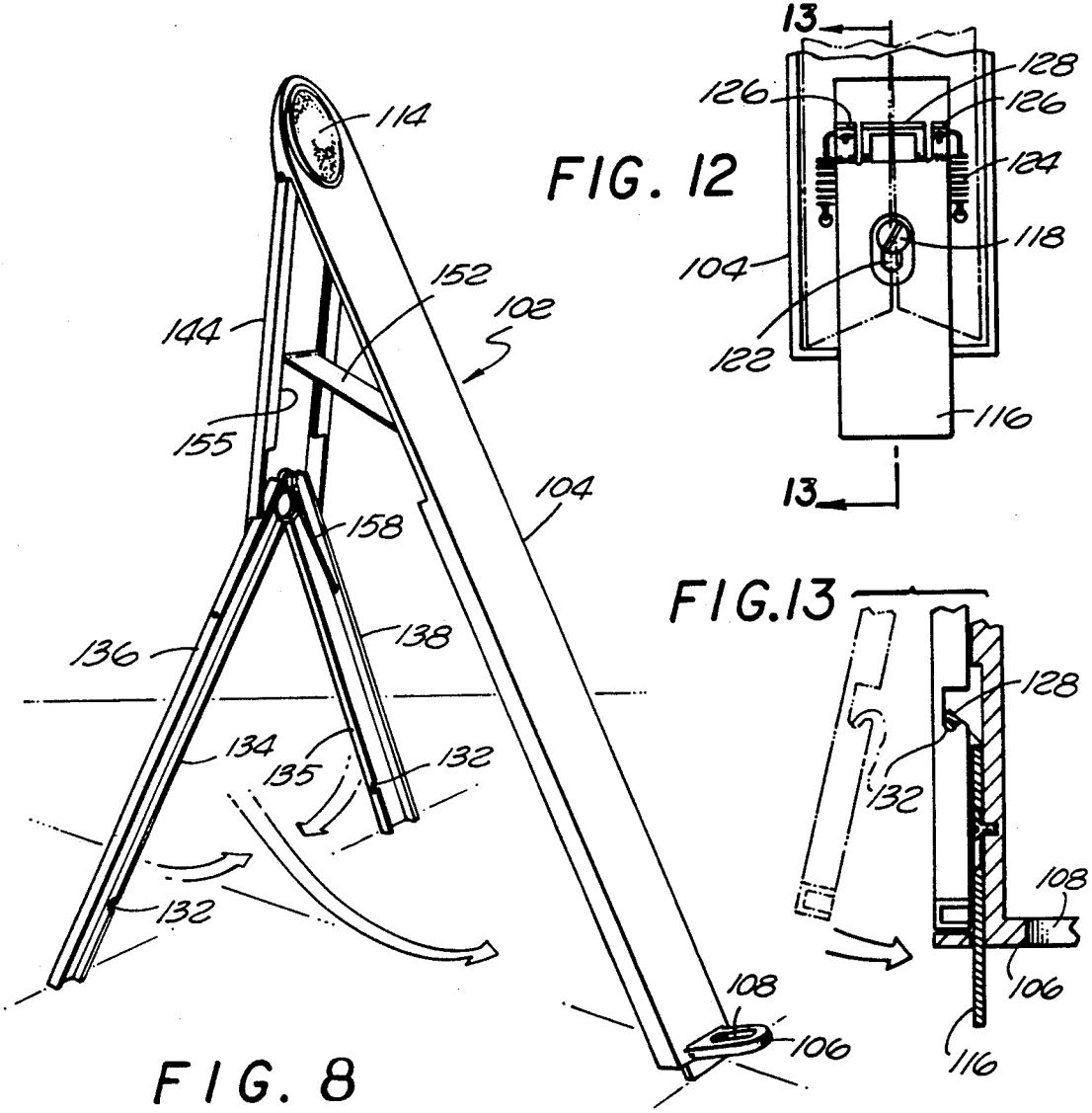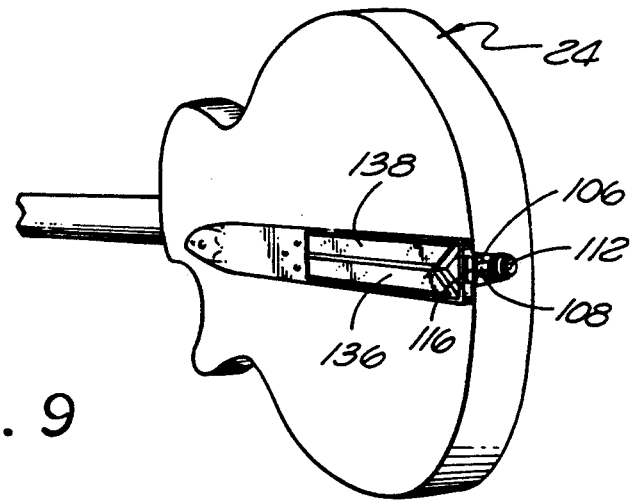

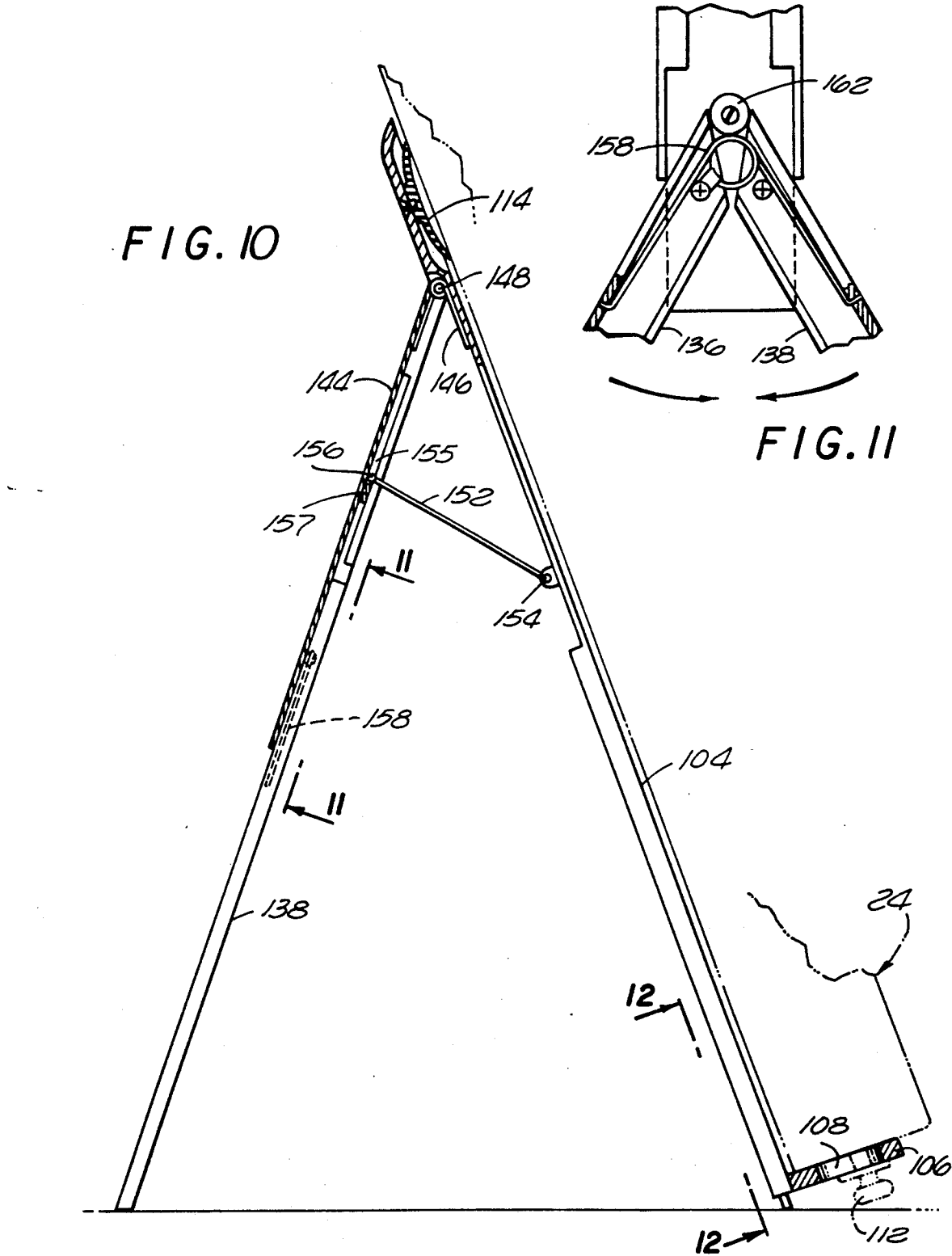

STAND FOR SUPPORTING A MUSICAL INSTRUMENT

BACKGROUND OF THE INVENTION

1. Field of the Invention

The field of art to which the invention pertains includes the field of musical instrument stands, and more particularly, to a musical instrument stand for enabling the instrument to remain in an upright position when not in use and be retained on the instrument when the instrument is in use.

2. Description of the Prior Art

Conventional musical instrument stands are either of the type where the stand has been permanently physically secured to the instrument such as by drilling or otherwise attaching the stand to the instrument, or where the stand is only utilized to support the instrument when not in use. In the latter case, when the instrument is used, the instrument is removed from the stand.

In U.S. Pat. No. 4,693,161, a stand is physically attached by screws to the rear surface of the instrument. A pair of legs which can fold adjacent to the rear surface of the instrument, together with the bottom of the instrument are utilized to form a support for the instrument when not in use.

In U.S. Pat. No. 3,251,258, a display stand or holder is curved to fit the bottom of an instrument having a cover thereon. The stand and a leg form a tripod.

Other known patents include U.S. Pat. Nos. 4,592,265; 2,796,795; 1,673,205; 4,691,610; 4,247,029 and 1,684,910.

SUMMARY OF THE INVENTION

A stand for a musical instrument having a longitudinal axis, and a front surface across which playing strings are located, a rear surface and a bottom surface. The stand comprises a housing having a first surface adjacent to and secured to the rear surface of the instrument and extending along the instrument lengthwise axis from the bottom surface of the instrument. A pair of retractable legs are releasably secured to the housing and movable from a flush position in the housing when the stand is not in use to an erect position where the legs and a portion of the housing adjacent the guitar bottom surface act to support the instrument.

The retractable legs can be spring-loaded in the housing and automatically released when needed. The instrument can be played while the stand is attached to the instrument. Further, the stand is easily removable from the instrument and re-attachable to another musical instrument when desired.

The advantages of this invention, both as to its description and mode of operation, may best be understood by reference to the following detailed description taken in connection with the accompanying drawings in which like reference numerals designate like parts throughout the figures.

FIG. is a perspective view of a guitar mounted on the stand with the stand in a collapsed position.

FIG. 3 is a perspective view of the stand in an extended position with the guitar removed therefrom.

FIG. 4 is a cross-sectional view of the stand taken along the line 4—4 of FIG. 3.

FIG. 5 is a cross-sectional view of the stand taken along the line 5—5 of FIG. 3.

FIG. 6 is a cross-sectional view of the stand taken along the line 6—6 of FIG. 3.

FIG. 7 is a cross-sectional view of the stand taken along the line 7—7 of FIG. 4.

FIG. 8 is a perspective view of an alternative embodiment of a stand.

FIG. 9 is a perspective view of the stand of FIG. 8 attached to a guitar in a collapsed position.

FIG. 10 is a side view, partially in cross-section, illustrating the stand of FIG. 8.

FIG. 11 is a partial side view of the stand of FIG. 10, taken along the line 11—11 thereof.

FIG. 12 is a partial plan view of the stand of FIG. 10 taken along the 12—12 thereof; and FIG. 13 is a cross-sectional view of the stand taken along the line 13—13 of FIG. 12.

DESCRIPTION OF THE PREFERRED EMBODIMENT

Figure 1:
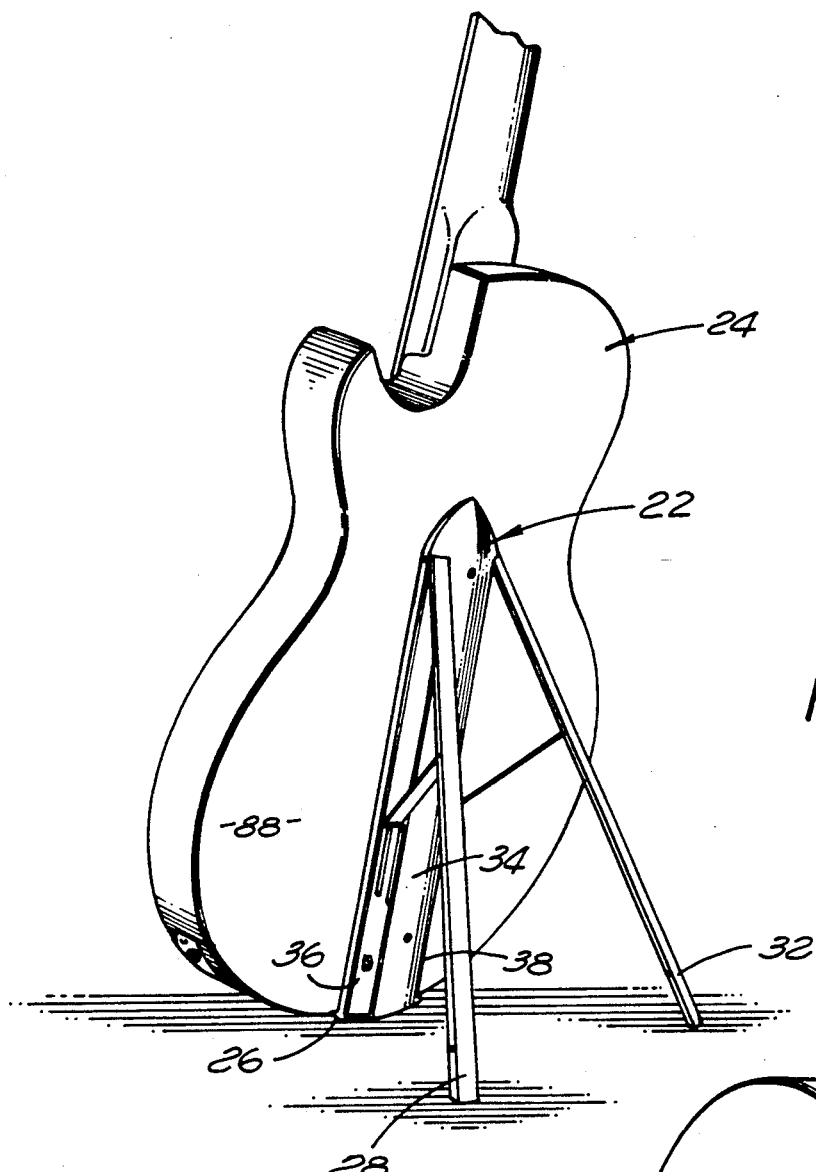
FIG. 1 is a perspective view illustrating a guitar mounted on the stand.

Referring now to the drawings, there is shown in FIG. 1, a stand 22 which is used to support a conventional musical instrument such as a guitar 24. While a guitar has been illustrated in the drawings, it should be understood that the stand could be used with other instruments as well. The stand 22 contains a horizontal base 26 (FIG. 2) and a pair of retractable legs 28 and 32 which together act to support the musical instrument in the position shown in FIG. 1.

Figure 2:
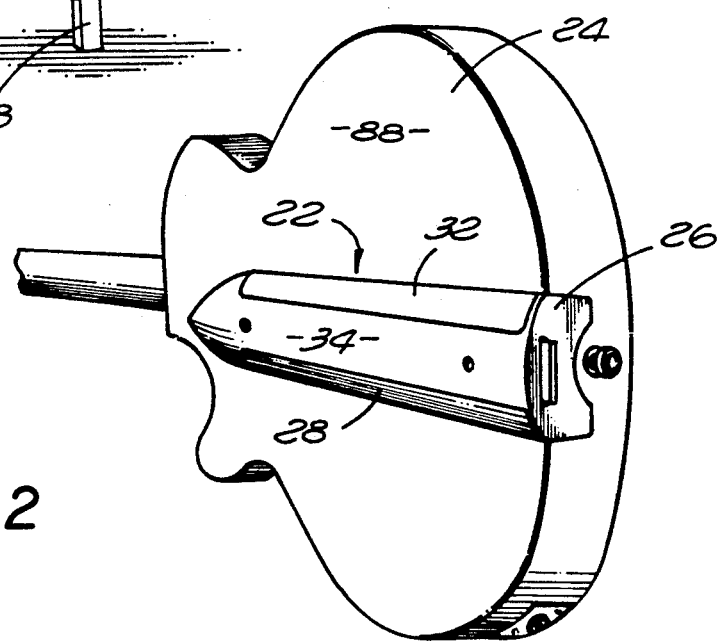

As illustrated in FIG. 2, when the musical instrument 24 is in use, the retractable legs 28 and 32 are collapsed into a stand housing 34. In the collapsed position, the retractable legs 28 and 32 are positioned flush in stand grooves 36 and 38, respectively, when the stand is not in use.

Referring now to FIG. 3, the stand 22 is shown in greater detail with the guitar 24 removed therefrom. Release of the retractable legs 28 and 32 is accomplished by a slide 42 positioned so that it extends beyond the horizontal base 26 of the stand intermediate the grooves 36 and 38. The slide is movable in a plane along the axis of the stand housing 34 and contains a slide end plate 44 at the interior end thereof. The end plate 44 contains a pair of tangs 46 and 48, shown more clearly in FIG. 5, which extend through openings 52 and 54, respectively, of the housing 34.

A pair of springs 56 and 58 are fixed at one end to the housing 34 and at the other end to the slide end plate 44. The springs 56 and 58 tend to keep the slide 42 in the downward position shown in in FIG. 3. The slide end plate 42 is retained to the housing 34 by means of a holder plate 62, which is fastened to the housing by means of a screw 64. A slot 66 in the slide 42 enables the screw 64 to pass therethrough allowing the slide 42 to move with respect to the holder plate 62.

Each of the retractable legs 28 and 32 contain a transverse leg pin 68 which is locked (FIG. 5) to the tangs 46 and 48, respectively, when the stand 22 is the collapsed position shown in FIG. 2. The stand 22, when held and pushed in a downward position so that the slide 42 moves upwardly, causes the tangs 46 and 48 to release the leg pins 68, (as shown in phantom in FIG.5) enabling the retractable legs 28 and 32 to move away from the housing 34 at their free ends.

Each of the retractable legs 28 and 32 are secured intermediate their ends to foldable arms 72 and 74, respectively. The foldable arms 72 and 74 are each connected at one end to the retractable legs 28 and 32 and at the other end are movably connected to arm springs 76 and 78, respectively. The arm springs 76 and 78 are fixed at one end thereof to the housing 34 and at the other end, as shown in FIGS. 4 and 7, to a pin 82, movable in housing grooves 36 and 38 (see FIG. 1 also).

Thus, when the slide 42 is actuated, releasing the retractable legs 28 and 32, springs 76 and 78 tend to cause the legs 28 and 32 to move outwardly to the support position shown in FIG. 1.

A pair of suction cups 84 and 86 are positioned adjacent to the rear surface 88 of the guitar surface and lock the stand 32 to the surface. The suction cups are secured to the housing 34 by means of screws 90 as shown in FIG. 6.

Thus, the stand 22 can easily be removed from the guitar 24 or secured thereto without any permanent drilling or fixtures when not in use and positioned on the housing as illustrated in FIG. 2 so as not to interfere with the use of the guitar. The entire stand can be made of lightweight aluminum or other material which does not vary the weight of the guitar when held.

Referring now to FIG. 8, an alternative arrangement of the guitar stand is shown. The stand 102 of FIG. 8 contains a U-shaped cross-sectional housing 104 having a horizontal attaching base 106 at one end thereof. The horizontal attaching base 106 contains an aperture 108 through which the guitar strap nut 112 can pass and can be used to secure the stand 102 to the guitar 24 as shown in FIG. 9. Further, it should be understood that the aperture 108 need not be closed, but can be formed of an open-ended slot as well.

The stand housing 104 contains the horizontal attaching base 106 at one end thereof and a suction cup 114 at the other end thereof. The suction cup 114 is also used to attach the stand at the back surface of the guitar 24.

Referring now to FIG. 12, a release slide 116 is retained to the interior of the U-shaped housing 104 by means of a screw 118 positioned in the slot 122 of the slide. Springs 124 are fixed at one end to the interior of the housing 104 and the other end thereof is movable with arms 126 at the interior end of the slide 116. A horizontal retaining pin 128 formed at the end of the slide adjacent the spring arms 126 locks into notches 132 (FIGS. 8 and 13) formed on the interior side walls 134 and 135 of a pair of retractable legs 136 and 138, respectively, (see FIGS. 8 and 13).

The legs 136 and 138 are generally U-shaped configurations, with the notches 132 formed on the adjacent abutting surfaces 134, 135 of each of the legs. The legs 136 and 138 are retained in the housing 104 as shown in FIG. 9 until the slide 116 is moved upwardly, releasing the legs 136 and 138 as shown in phantom in FIG. 13. The legs 136 and 138 are retained with their axes parallel to each other when retained in the housing 104 as shown in FIG. 9, but intersect along their axes when released from the housing as will be explained hereinafter.

An outer U-shaped housing portion 144 is attached to the main housing 104 by means of a spring 146 and pin 148 arrangement shown in FIG. 10. The pin 14 interlocks the end of the U-shaped housing portion 144 and the housing 104 adjacent the suction cup 114 mount. When the legs 136 and 138 are released from the housing 104, the spring 146 acts to move housing portion 144 to the position shown. A drop arm 152 is connected to the main housing 104 below the pin 148 and is rotatable at one end about an end pin 154 in the main housing 104. The other end of the drop arm 152 is positioned in a slot 155 and movable with an end pin 156 in the slot. A stop 157 in the slot 155 limits movement of the end pin 156.

The retractable legs 136 and 138 are secured at their upper ends to the lower position of U-shaped housing 144 and can pivotably move apart at their upper junction so as to form the inverted V shown in FIG. 8. A spring 158 (FIG. 11) forces the legs 136 and 138 apart at their upper apex upon their release from the housing 104. Simultaneously, the spring 146 tends to separate the outer U-shaped housing portion 144 and the main housing 104, enabling the stand to form in the position shown in FIG. 8. The drop arm 152 length determines the angle formed by the intersection of the axis of the main housing 104 and the housing portion 144.

A washer 162 positioned above the spring 158 in the housing portion 144 limits the movement of the upper ends of the legs 136 and 138 as they tend to intersect with each other along their longitudinal axes. Collapsing of the stand of FIGS. 8–13 is easily accomplished as directed by the arrows of FIG. 8. The legs 136 and 138 are moved adjacent each other and then returned to the housing 104 with the retaining pin 128 locked in the leg notches 132.

I claim:

1. A musical instrument stand for an instrument having a longitudinal axis, the instrument body having a front surface across which playing strings are located, a rear surface and a bottom surface, said stand comprising:
   a main housing having a first surface adjacent to and secured to the rear surface of said instrument and extending along the instrument lengthwise axis from the bottom surface of said instrument; and
   a pair of retractable legs secured to said main housing and movable from a flush position in grooves formed in said housing when said stand is not in use to an erect position where the legs and a portion of said main housing adjacent said instrument bottom surface act to support said instrument.

2. A musical instrument stand in accordance with claim 1 wherein said stand contains a slide movable in said main housing, a locking mechanism formed in said legs, movement of said slide releasing said locking mechanism enabling a portion of said legs to separate from said main housing.

3. A musical instrument stand in accordance with claim 2 wherein said main housing and said legs form a tripod configuration to support said instrument when a portion of said legs are separated from said housing and said housing remains adjacent to and secured to said rear surface of said instrument.

4. A musical instrument stand in accordance with claim 2 wherein said slide is movable in said main housing at one end thereof; and said retractable legs are pivotably attached to said main housing at the other end of said housing, said housing and said legs forming a tripod when said legs are released from said main housing adjacent said slide.

5. A musical instrument stand in accordance with claim 1 wherein said housing contains at least one suction cup for securing said stand to said musical instrument.

6. A musical instrument stand in accordance with claim 4 wherein said instrument contains a strap nut formed on the bottom surface thereof, said main housing having a horizontal attaching base secured thereto adjacent said slide, said horizontal attaching base having an opening through which said strap nut can pass for securing said stand to said instrument.

7. A musical instrument stand in accordance with claim 1 wherein said retractable legs each have a parallel axis when said legs are in a flush position in said main housing and are at intersecting axes which said retractable legs are released from said housing, said legs forming an inverted-V.

8. A musical instrument stand in accordance with claim 7 wherein said leg ends which ajoin each other at the junction of said inverted-V, each being joined to one end of a housing portion formed in a plan parallel to the plane of said legs, the other end of said housing portion being connected adjacent an end of said main housing.

9. A musical instrument stand in accordance with claim 1, wherein said stand contains a slide having a first end extending through said stand housing adjacent said instrument bottom surface and having a plurality of tangs formed at the second end thereof, a locking mechanism formed in said retractable legs comprising a transverse leg pin in each retractable leg coupled to one of said tangs, said slide being moveable with respect to said stand housing plane for releasing and separating said leg pins from said associated tang enabling said legs to separate from said flush position in said housing grooves.

10. A musical instrument in accordance with claim 9, wherein the first end of said slide extends through a slot formed in a horizontal base of said stand, said stand horizontal base being formed adjacent said housing first surface and being secured thereto adjacent the bottom surface of said instrument.

* * * * *